(12) United States Patent
Wang et al.

(10) Patent No.: US 6,539,848 B2
(45) Date of Patent: Apr. 1, 2003

(54) JUICER

(75) Inventors: Nigel Wang, Taipei (TW); Alison A. Roach, Schaumburg, IL (US); Bruce Odessky, Vernon Hills, IL (US)

(73) Assignee: Columbia Insurance Company, Omaha, NE (US)

( * ) Notice: Subject to any disclaimer, the term of this patent is extended or adjusted under 35 U.S.C. 154(b) by 0 days.

(21) Appl. No.: 10/151,711

(22) Filed: May 20, 2002

(65) Prior Publication Data

US 2003/0005832 A1 Jan. 9, 2003

Related U.S. Application Data

(63) Continuation of application No. 09/901,361, filed on Jul. 9, 2001, now abandoned.

(51) Int. Cl.⁷ .............................. A23N 1/00; A47J 19/02
(52) U.S. Cl. ............................................ 99/508; 99/506
(58) Field of Search .......................... 99/495, 501–508, 99/496, 497; 220/403, 4.21, 4.26, 625; 100/213, 208; D7/665, 678

(56) References Cited

U.S. PATENT DOCUMENTS

| | | | |
|---|---|---|---|
| 279,989 A | | 6/1883 | Steinhorst |
| 922,449 A | * | 5/1909 | Bennett ........................ 99/507 |
| 1,266,030 A | | 5/1918 | Lins |
| 1,327,929 A | * | 1/1920 | Tripke ..................... 99/503 X |
| 1,674,475 A | * | 6/1928 | Loomis ........................ 99/504 |
| 1,698,860 A | | 1/1929 | Ulrich |
| 1,747,641 A | | 2/1930 | Morris |
| 1,757,609 A | | 5/1930 | Beardsley et al. |
| 1,957,346 A | | 5/1934 | Larson |
| 1,994,576 A | | 3/1935 | Dean |
| 2,008,899 A | * | 7/1935 | Daum ........................ 99/507 |
| 2,017,960 A | * | 10/1935 | Faulds ..................... 99/504 X |
| 2,042,341 A | * | 5/1936 | Ilgenfritz ..................... 99/505 |
| 2,057,727 A | * | 10/1936 | Blum ........................ 99/505 |
| 2,160,388 A | * | 5/1939 | Morse ..................... 99/503 X |
| 2,212,328 A | * | 8/1940 | Scurlock ..................... 99/504 |
| D141,788 S | | 7/1945 | Quam |
| 4,125,064 A | * | 11/1978 | Ackereet ..................... 99/508 |
| 4,706,559 A | * | 11/1987 | DeZarate ..................... 99/504 |
| 4,961,374 A | * | 10/1990 | Lee ........................ 99/508 X |
| 5,088,392 A | | 2/1992 | Ancona et al. |
| 5,275,307 A | | 1/1994 | Freese |

* cited by examiner

*Primary Examiner*—Timothy F. Simone
(74) *Attorney, Agent, or Firm*—Altheimer & Gray

(57) ABSTRACT

A juicer includes a reservoir with a spout and an annular rim having an extended portion with at least two holes. An extractor having an upright convex extracting dome is surrounded by an annular trough having openings therethrough. The extractor has a strainer element and is removably seated on the annular rim of the reservoir. The extractor has at least one peg that can mate with the at least two holes in at least two positions. The strainer element covers the spout when the peg is mated with one of the holes in a first position. The strainer element does not cover the spout when the peg is mated with another of the holes in a second position. When mated, the extractor cannot rotated relative to the reservoir. A resilient, elastomeric foot on the reservoir prevents rotation of the reservoir relative to a supporting surface.

21 Claims, 5 Drawing Sheets

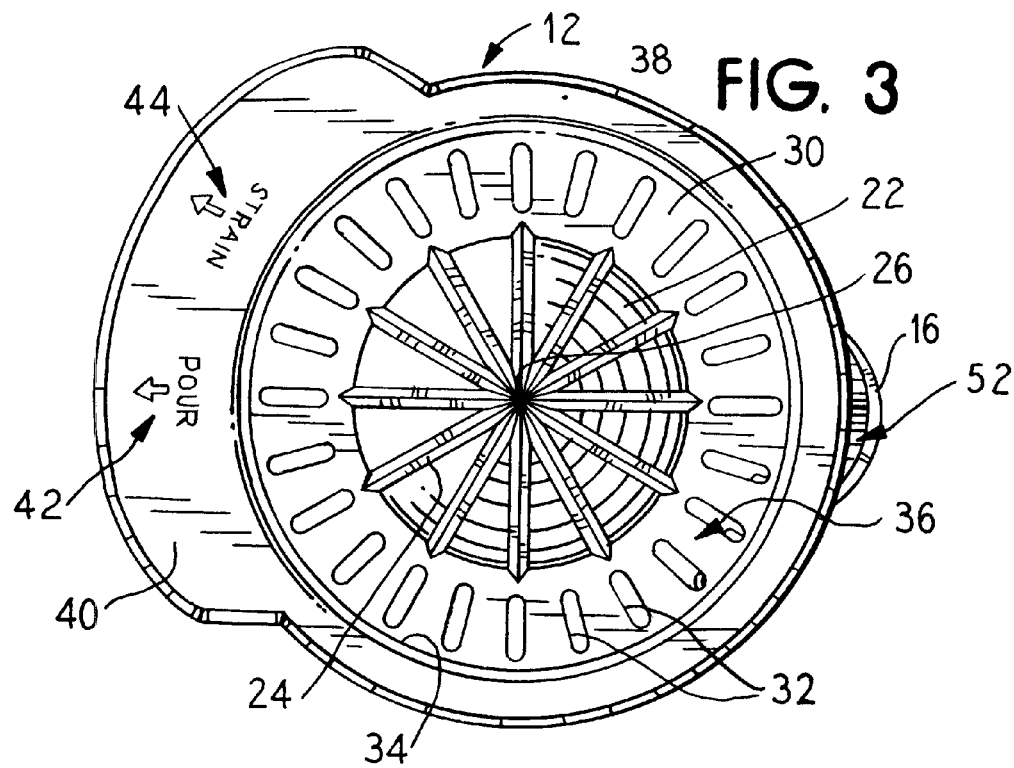
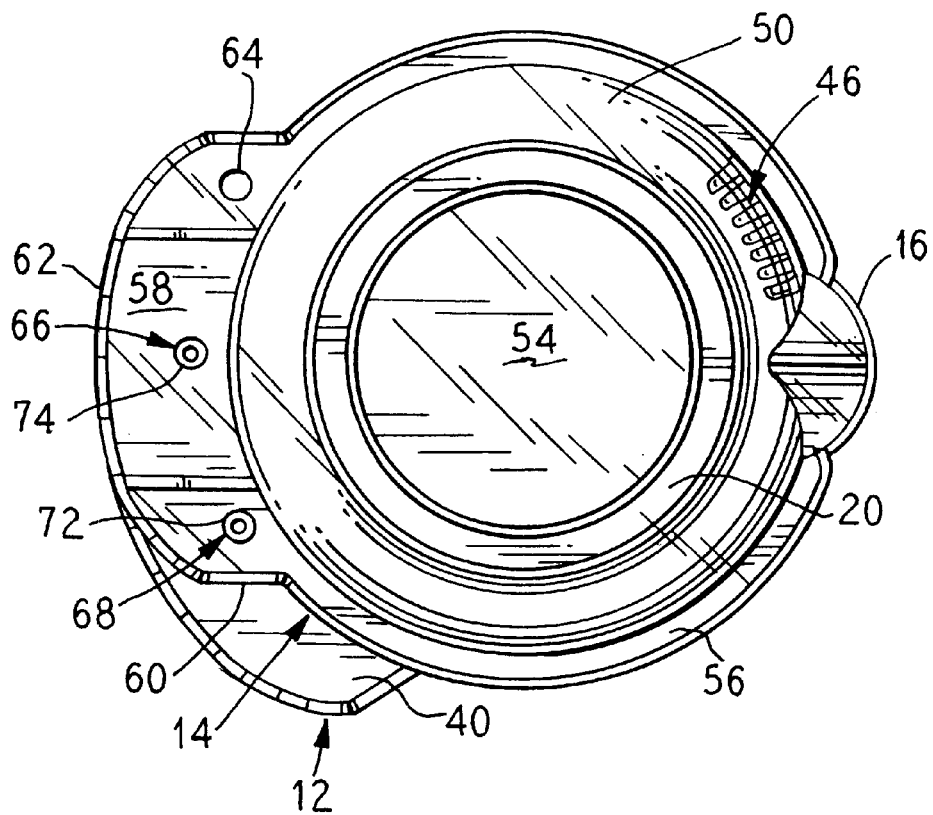

JUICER

This a continuation of Ser. No. 09/901,361 filed Jul. 9, 2001, now abandoned.

TECHNICAL FIELD OF THE INVENTION

This invention relates generally to manually-operated kitchen devices for preparing food, and more particularly to manual juicers for extracting juice from citrus fruits such as oranges, lemons and limes.

BACKGROUND OF THE INVENTION

The juice of citrus fruit is often used in the preparation of food, as a beverage, or as a flavoring or constituent of food. Lemon juice, for example, can be used as a seasoning on fish or to protect cut fruit such as apples from browning, as a flavoring in iced tea and lemonade, and as a constituent of lemon meringue pie. Fresh squeezed orange juice can be enjoyed by itself as a breakfast beverage. Lime juice can be used for many of the same purposes as lemon juice, and as a flavoring in alcoholic mixed drinks. Many other uses for citrus juices are well known.

Extracting juice from citrus fruit can be accomplished in various ways. Perhaps the simplest way is to cut the fruit in half transversely and manually squeeze the half-fruit to extract the juice. While simple, this method is not very efficient because a significant portion of the juice remains unextracted, and squeezing the fruit by hand with enough force to extract the juice can be tiring.

A more efficient method of manually extracting juice from citrus fruit uses a manual juicer that includes an upstanding, externally ridged, convex dome generally corresponding in shape and size to the inside of the rind of a citrus fruit that has been cut in half transversely. The ridged dome is supported by a surrounding ring defining a slotted annular trough that catches the juice and collects the seeds while the juice drains through the slots of the trough into a reservoir, such as a bowl, located below. In use, one half of a citrus fruit that has been cut transversely is placed on top of the ridged dome, cut side down, and the half-fruit is pressed downwardly onto the dome while twisting the fruit relative to the dome about a vertical axis. The ridges on the dome disrupt the flesh of the fruit, releasing the juice.

A conventional manual juicer as described above usually has a handle that extends radially and horizontally from one side of the juicer, and a protrusion that extends radially and horizontally from the opposite side of the juicer. The handle can rest upon the rim at one side of a bowl while the protrusion rests on the rim at the opposite side of the bowl. To prevent rotation of the juicer and to stabilize it, the handle is held in one hand while the other hand is used to press and rotate the half-fruit against the juicer dome. Consequently, extraction of juice using a conventional manual juicer is a two-handed operation. Such a juicer can be somewhat unstable because the juicer is not fixed to the reservoir bowl but merely lies across the bowl, resting on the rim at opposite sides.

Although the seeds are collected in the slotted annular trough of the juicer, most of the pulp passes through the slotted trough, along with the juice, into the bowl below. Some recipes require the pulp to be removed from the juice prior to use, and many people, as a matter of preference, prefer to drink orange juice having little or no pulp. If juice with the pulp removed is desired, then a separate subsequent step is require to strain the juice to remove the pulp, such as by pouring the juice from the bowl through a wire mesh strainer and into a second bowl. Consequently, the preparation of strained juice can be somewhat cumbersome.

It would be desirable to provide a manual juicer for extracting juice from cut citrus fruit that permits one-handed, stable operation and that permits the preparation of strained juice, if desired, without a subsequent step. This and other desirable features are provided by a juicer and mating reservoir configured in accordance with the present invention.

SUMMARY OF THE INVENTION

The present invention, according to one aspect thereof, includes a juicer having a reservoir with a spout and an annular rim having a first indexing component. An extractor has an upright convex extracting dome surrounded by an annular trough having openings therethrough. The extractor has a strainer element and is removably seated on the annular rim of the reservoir. The extractor has a second indexing component that can mate with the first indexing component in at least two positions. The strainer element covers the spout when the first indexing component is mated with the second indexing component in a first position. The strainer element does not cover the spout when the first indexing component is mated with the second indexing component in a second position.

Other aspects and advantages of the present invention will be apparent from the following descriptions of the preferred embodiments, made with reference to the drawings.

BRIEF DESCRIPTION OF THE DRAWINGS

In the drawings,

FIG. 3 is a top plan view of the juicer of FIG. 1;

FIG. 6 is a bottom plan view of the juicer of FIG. 1, assembled.

DESCRIPTION OF THE PREFERRED EMBODIMENTS

Figure 1:
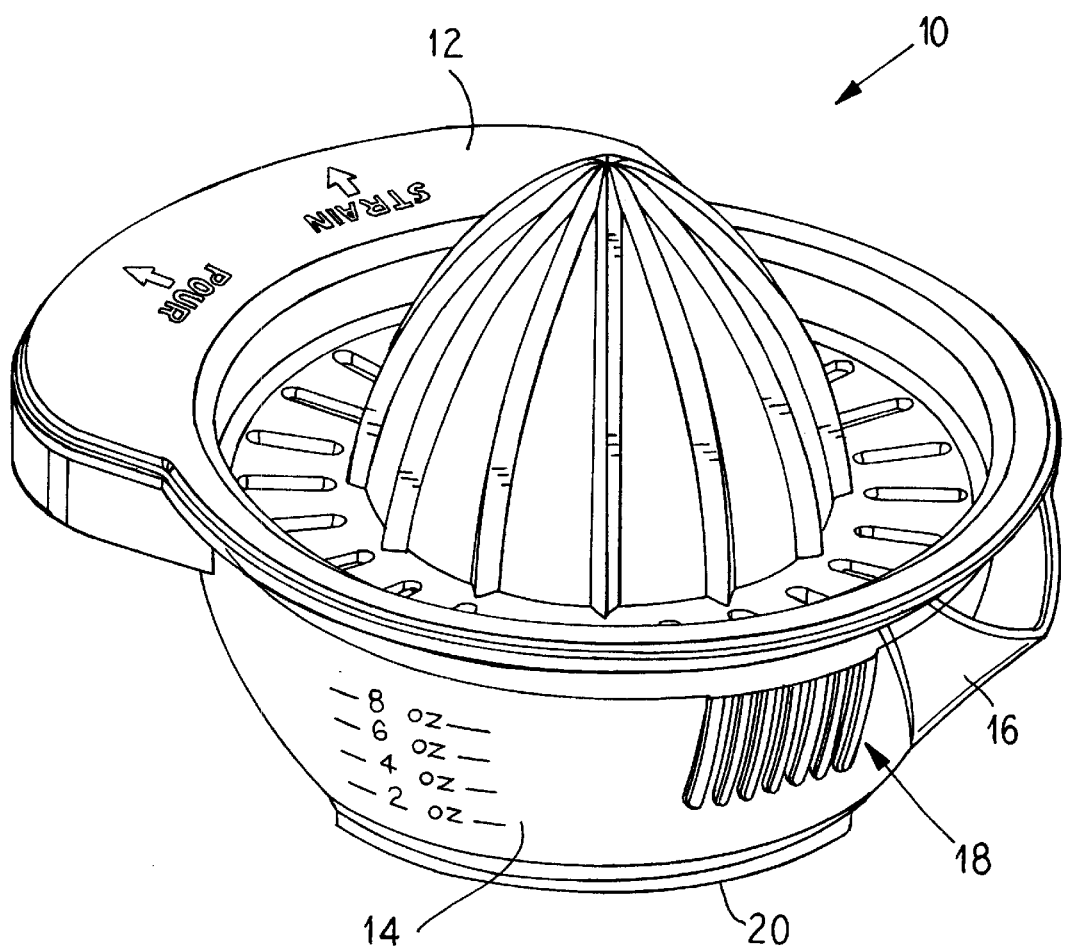
FIG. 1 is a perspective assembly view of a juicer in accordance with the present invention.
Figure 2:
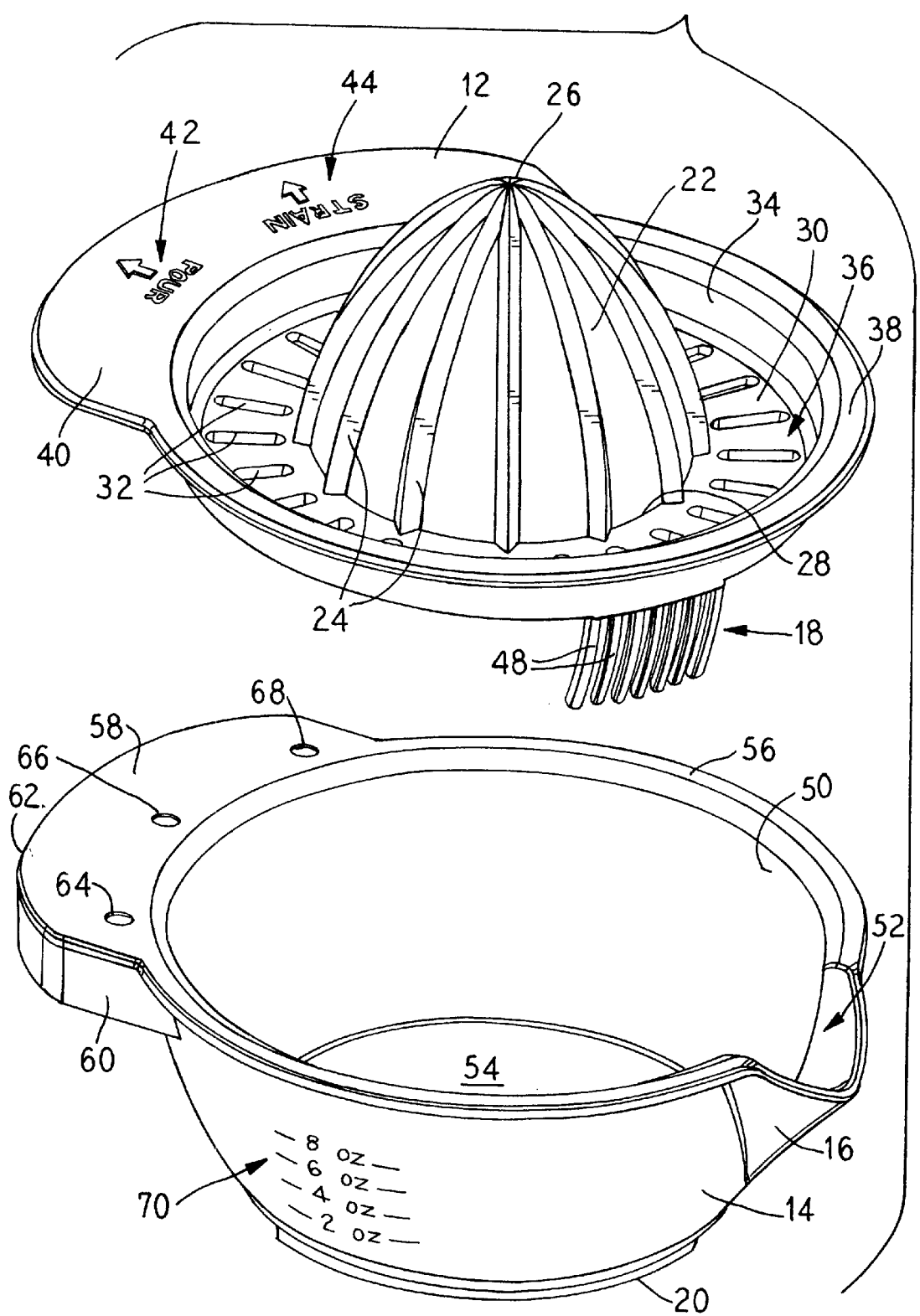
FIG. 2 is a perspective exploded view of the juicer of FIG. 1, showing the extractor and the reservoir, separated.

Referring to FIGS. 1–3, there is illustrated a juicer 10 embodying the present invention. Juicer 10 includes two principal components, an extractor 12 and a reservoir 14. As described further below, extractor 12 is removably seated on reservoir 14 and can be locked against rotation relative thereto in one of two positions. In a first position, juice and pulp collected in reservoir 14 can be poured unimpeded through spout 16. In a second position, strainer 18 which is an integral component of extractor 12 is disposed across spout 16 to catch the pulp so that only strained juice can be poured through spout 16. Extractor 12 is readily removable from reservoir 14 for cleaning, and for repositioning between the first and second positions relative to reservoir 14. Preferably, extractor 12 and reservoir 14 are molded of plastic material. Reservoir 14 is preferably transparent. A foot 20 on reservoir 14 is made of a resilient elastomeric material suitable for preventing slippage or rotation of reservoir 14 relative to the table or counter top on which juicer 10 is placed.

Because extractor 12 can be locked against rotation relative to reservoir 14 in one of two positions, and because reservoir 14 is prevented by foot 20 from slipping or rotating relative to the horizontal surface on which it rests, torque applied to the cut citrus fruit is resisted by the friction between foot 20 and the table or counter top. Juicer 10 is stable against rotation relative to the horizontal surface without being held. Therefore, one-handed operation is possible.

Referring especially to FIG. 2, extractor 12 and reservoir 14 are shown separated from each other. Extractor 12 includes an upstanding, convex dome 22 having a plurality of longitudinal ridges extending from the outer convex surface thereof and meeting at an apex 26 of dome 22. Extending horizontally and radially from the base 28 of dome 22 is a substantially flat annular floor 30. A plurality of radial slots 32 are defined through floor 30 and are spaced circumferentially about dome 22. Slots 32 are dimensioned to retain the seeds of the citrus fruit while allowing pulp and juice to pass through into reservoir 14. Extending upwardly from floor 30 is an annular perimeter wall 34 space from dome 22 to define an annular trough 36 therebetween. Trough 36 is bounded inwardly by dome 22, below by floor 30, and outwardly by perimeter wall 34. Extending radially and horizontal outwardly from the top of perimeter wall 34 is an annular flange 38 having an extended portion 40, the purpose of which is set forth below.

A pair of indicia 42 and 44 are integrally molded into the top surface of extended portion 40 of flange 38. Indicia 42 and 44 guide the user in orienting extractor 12 relative to reservoir 14 in one or the other of the pour and strain positions.

Extending downwardly from perimeter wall 34 and floor 30 is pulp strainer 18 located diametrically opposite indicia 44, i.e., the strain indicia. Pulp strainer 18 comprises a plurality of generally vertical, parallel elongate teeth 48 spaced from one another sufficiently to pass juice therebetween, but close enough to trap a substantial portion of the pulp. Teeth 48 are curved downwardly and radially inwardly in a curvature selected to avoid interference of teeth 48 and the side wall 50 of reservoir 14. Alternatively, teeth 48 could extend vertically downwardly if the wall of reservoir 14 were correspondingly straight and vertical. Pulp strainer 18 spans a circumferential distance sufficient to cover the opening 52 of spout 16 of reservoir 14. When in the strain position, pulp strainer 18 covers opening 52 and strains the pulp from juice that is poured from reservoir 14. When in the pour position, pulp strainer 18 is displaced to one side of opening 52 and does not impede the flow of juice and pulp through spout 16.

Reservoir 14 includes a bottom wall 54, an annular side wall 50 that curves upwardly and outwardly from bottom wall 54, and an annular flange 56 that extends horizontally and radially outwardly from the top of side wall 50. Flange 56 includes an extended portion 58 that extends horizontally diametrically and symmetrically opposite spout 16. A vertical perimeter reinforcing wall 60 extends downwardly from the outer edge 62 of extended portion 58. Reinforcing wall 60 is integrally connected to side wall 50 of reservoir 14 and serves to strengthen and support extended portion 58.

Three holes 64, 66 and 68 are defined through extended portion 58. Hole 66 is diametrically opposite spout 16, and holes 64 and 66 are equally spaced circumferentially on either side of hole 66. Each of holes 64, 66 and 68 is radially equidistant from the center line of reservoir 14. Holes 64, 66 and 68 cooperate with a pair of pegs, described further below, that extend downwardly from extended portion 40 of extractor 12 to removably lock extractor 12 against rotation relative to reservoir 14 in one of two positions, i.e., the pour and strain positions.

Indicia 70 integrally molded onto side wall 50 of reservoir 14 indicate the level of liquid therein. Preferably, indicia labeled in liquid ounces are provided on one side of reservoir 14 and indicia labeled in milliliters are provided on the opposite side of reservoir 14.

Foot 20, comprising an annular ring made of resilient elastomeric material is bonded to the outer surface of bottom wall 54 and extends downwardly therefrom a sufficient distance to preclude any other portion of reservoir 14 from touching a horizontal surface on which juicer 10 may be placed. Foot 20 provides sufficient friction between reservoir 14 and a horizontal surface, such as a table or counter top, to substantially preclude reservoir 14 from sliding or rotating during use.

Figure 4:
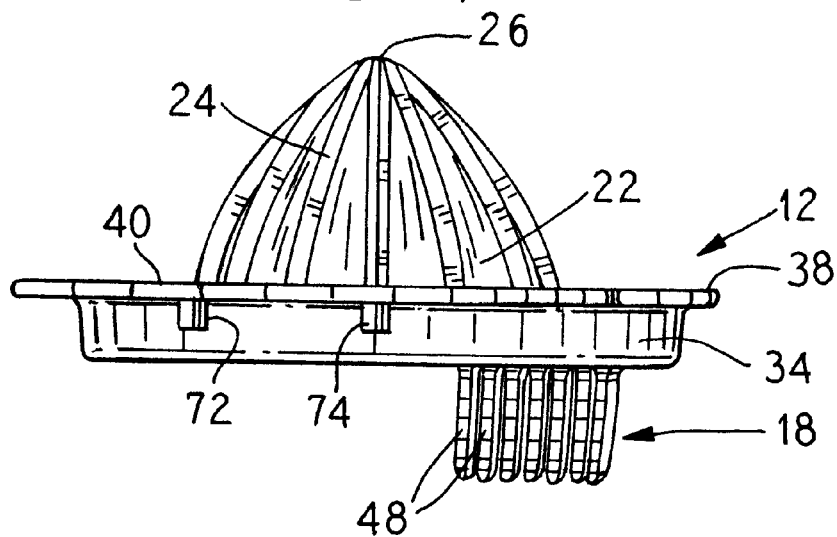
FIG. 4 is a side view of the extractor component of the juicer of FIG. 1.
Figure 5:
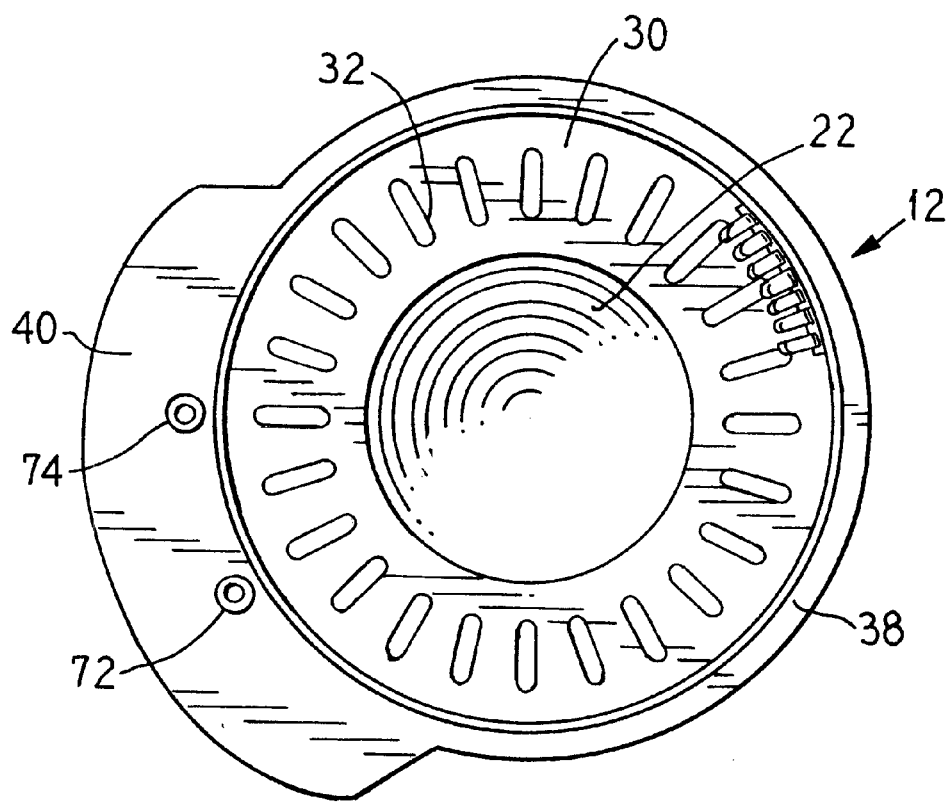
FIG. 5 is a bottom plan view of the extractor component of the juicer of FIG. 1.

Referring to FIGS. 4, 5 and 6, pegs 72 and 74 extend downwardly from the lower surface of extended portion 40 of extractor 12. Pegs 72 and 74 are sized to be received in a close but not binding fit within holes 64, 66 and 68. There are two pegs 72, 74 but three holes 64, 66, 68, which permits extractor 12 to be placed in one of two positions relative to reservoir 14 depending upon the holes in which pegs 72, 74 are placed. If pegs 72 and 74 are placed in holes 68 and 66, respectively, then extractor 12 is disposed in the pour position. If pegs 72 and 74 are placed in holes 66 and 64, respectively, then extractor 12 is disposed in the strain position. Peg 72 is located diametrically opposite pulp strainer 18, whereas peg 74 is spaced circumferentially from peg 72 a distance equal to the circumferential spacing of any two adjacent holes 64, 66 and 68. With pegs 72 and 74 received within holes 64, 66, 68, extractor 12 is locked against rotation relative to reservoir 14. Nevertheless, extractor 12 can easily be removed from reservoir 14 and repositioned.

Figure 7:
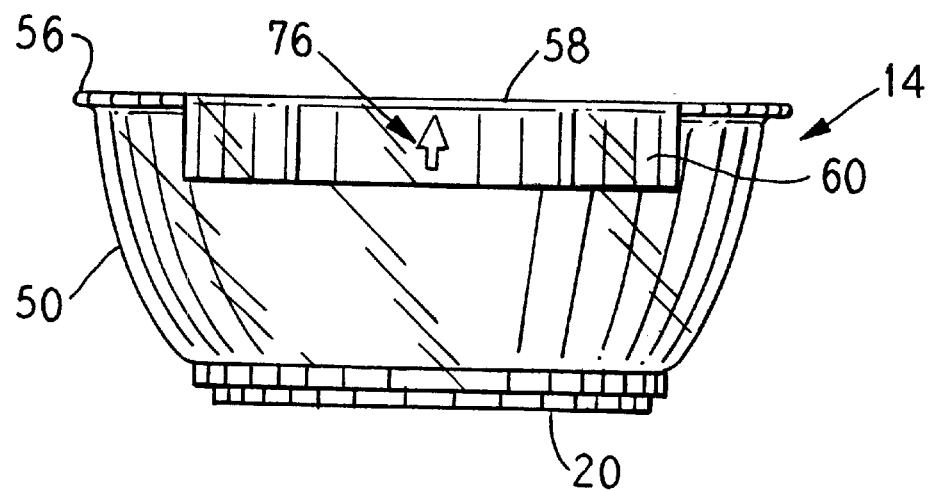
FIG. 7 is an end view of the reservoir component 14 of the juicer of FIG. 1.

Referring to FIG. 7, indicia 76 is integrally molded onto reinforcing wall 60 of reservoir 14 diametrically opposite spout 16. When either of indicia 42 or 44 of extractor 12 are aligned with indicia 76, pegs 72 and 74 are aligned with a respective pair of holes 64, 66 and 68, thereby facilitating the placement of extractor 12 in the pour or strain orientation.

Figure 8:
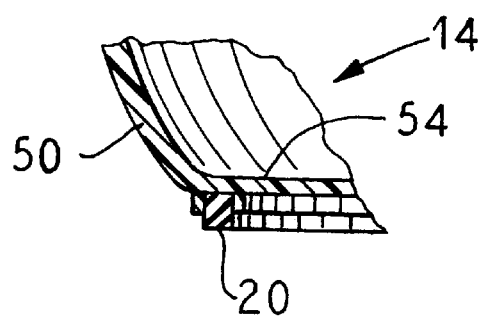
FIG. 8 is a partial cross-sectional view of the reservoir component of the juicer of FIG. 1.

In FIG. 8, a partial cross-section of reservoir 14 shows elastomer foot 20 extending downwardly from bottom wall 54.

Although the present invention has been described in detail in terms of preferred embodiments, the scope of the invention in which an exclusive right is claimed is defined by the claims appended below

We claim:

1. A juicer comprising:
   a reservoir with a spout and an annular rim having a first indexing component; and
   an extractor having an upright convex extracting dome surrounded by an annular trough having openings therethrough, the extractor having a strainer element and being removably seated on the annular rim of the reservoir, the extractor having a second indexing component that can mate with the first indexing component in at least two positions;

the strainer element covering the spout when the first indexing component is mated with the second indexing component in a first position, and the strainer element not covering the spout when the first indexing component is mated with the second indexing component in a second position.

2. The juicer of claim 1, wherein the first and second indexing components substantially prevent the extractor from rotating relative to the reservoir when mated.

3. The juicer of claim 1, wherein one of the first and second indexing components includes at least one indexing element and the other of the first and second indexing components includes at least two indexing elements.

4. The juicer of claim 3, wherein the at least one indexing element can mate with either of the at least two indexing elements.

5. The juicer of claim 1, wherein the first indexing component includes at least two indexing elements and the second indexing component includes at least one indexing element.

6. The juicer of claim 1, wherein the first indexing component includes at least two apertures and the second indexing component includes at least one peg.

7. The juicer of claim 6, wherein the extractor includes a radially extended portion supporting the at least one peg and the reservoir includes a radially extended portion defining the at least two apertures.

8. The juicer of claim 1, wherein the extractor includes an annular flange removably seated on the annular rim of the reservoir.

9. The juicer of claim 8, wherein the annular flange of the extractor includes an extended portion having indicia thereon for indicating alignment of the first and second indexing components.

10. The juicer of claim 1, wherein the reservoir has a foot made of resilient, elastomeric material for generating sufficient friction with a supporting surface to resist torque.

11. A juicer comprising:
    a reservoir with an annular rim having a first indexing component and a foot made of resilient, elastomeric material for generating sufficient friction with a supporting surface to resist torque; and
    an extractor having an upright convex extracting dome and being removably seated on the annular rim of the reservoir, the extractor having a second indexing component that can mate with the first indexing component to substantially preclude rotation of the extractor relative to the reservoir.

12. The juicer of claim 11, wherein the reservoir includes a spout and the extractor includes a strainer element that can cover the spout.

13. The juicer of claim 12, wherein the second indexing component can mate with the first indexing component in at least two positions.

14. The juicer of claim 13, wherein the strainer element covers the spout when the first indexing component is mated with the second indexing component in a first position, and the strainer element does not cover the spout when the first indexing component is mated with the second indexing component in a second position.

15. The juicer of claim 14, wherein one of the first and second indexing components includes at least one indexing element and the other of the first and second indexing components includes at least two indexing elements.

16. The juicer of claim 15, wherein the at least one indexing element can mate with either of the at least two indexing elements.

17. The juicer of claim 15 wherein the first indexing component includes at least two indexing elements and the second indexing component includes at least one indexing element.

18. The juicer of claim 17, wherein the first indexing component includes at least two apertures and the second indexing component includes at least one peg.

19. The juicer of claim 18, wherein the extractor includes a radially extended portion supporting the at least one peg and the reservoir includes a radially extended portion defining the at least two apertures.

20. The juicer of claim 11, wherein the extractor includes an annular flange removably seated on the annular rim of the reservoir.

21. The juicer of claim 20, wherein the annular flange of the extractor includes an extended portion having indicia thereon for indicating alignment of the first and second indexing components.

* * * * *